Dec. 24, 1935.  A. CURIONI  2,025,341
HEATING PLANT
Filed June 9, 1933  3 Sheets-Sheet 1

INVENTOR
Aldo Curioni
BY
ATTORNEY

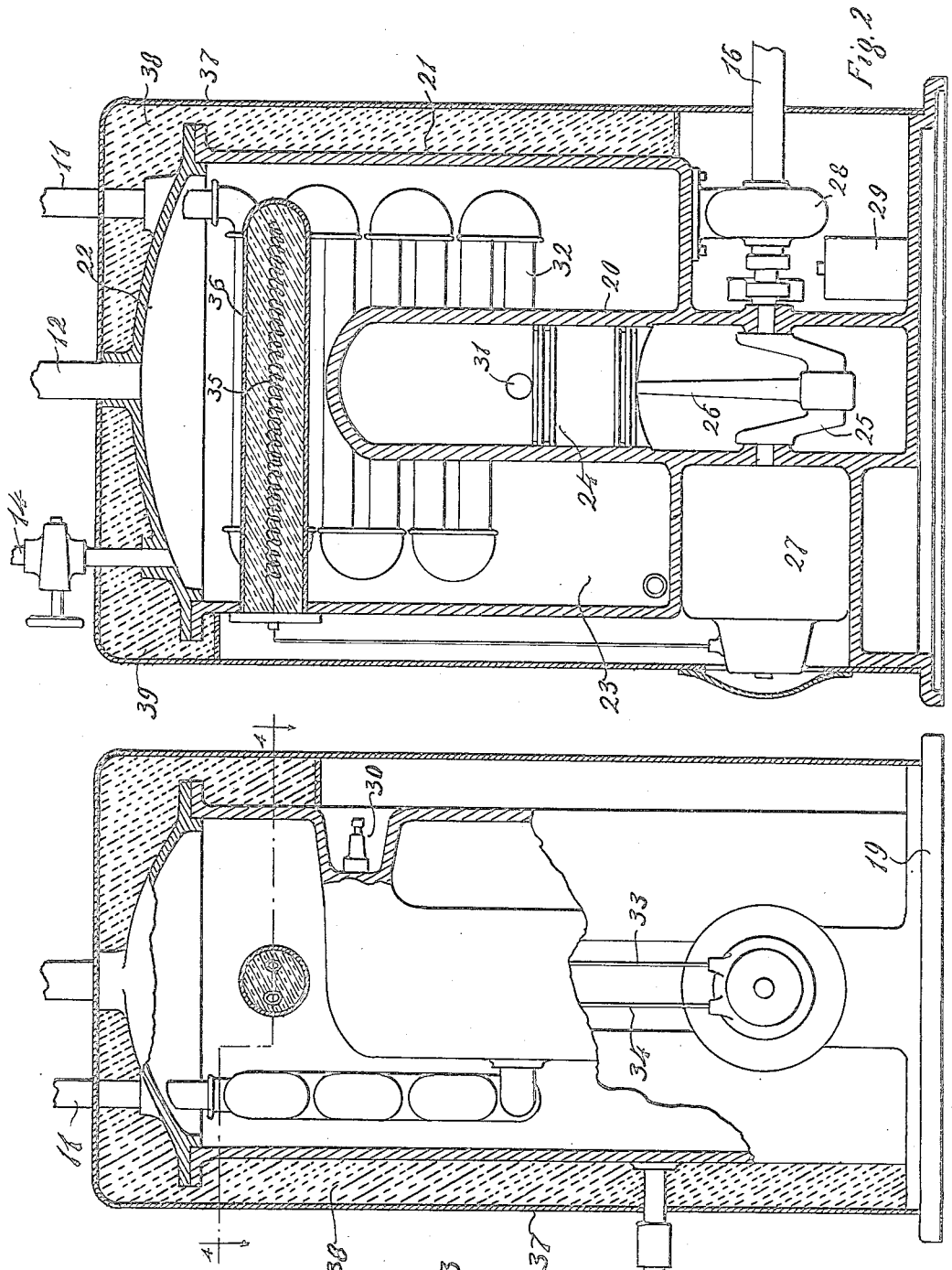

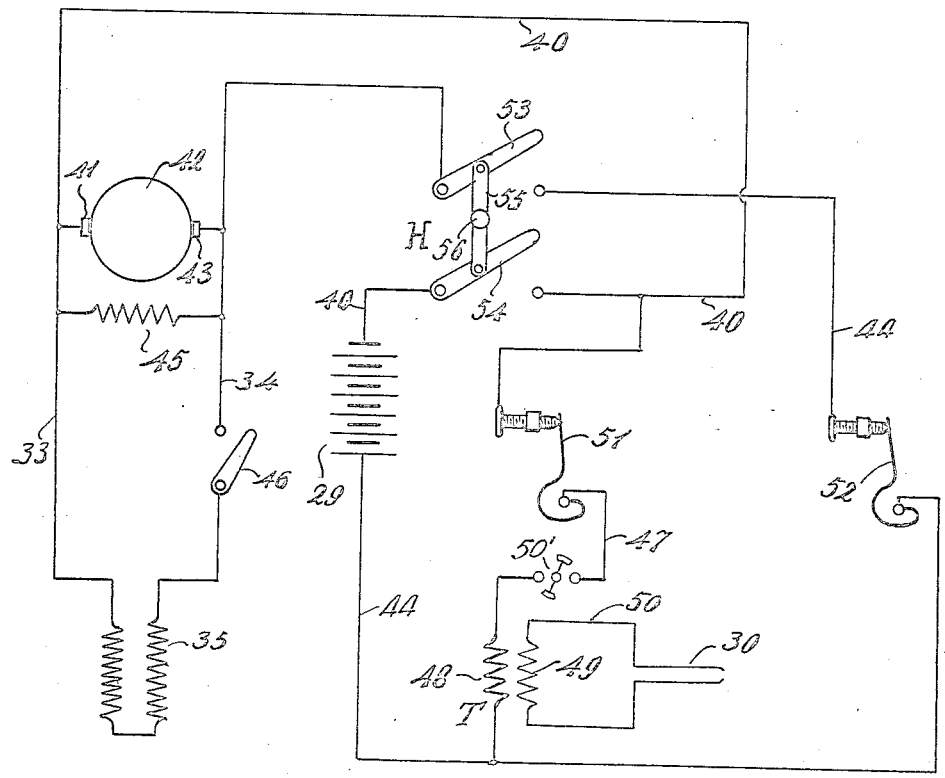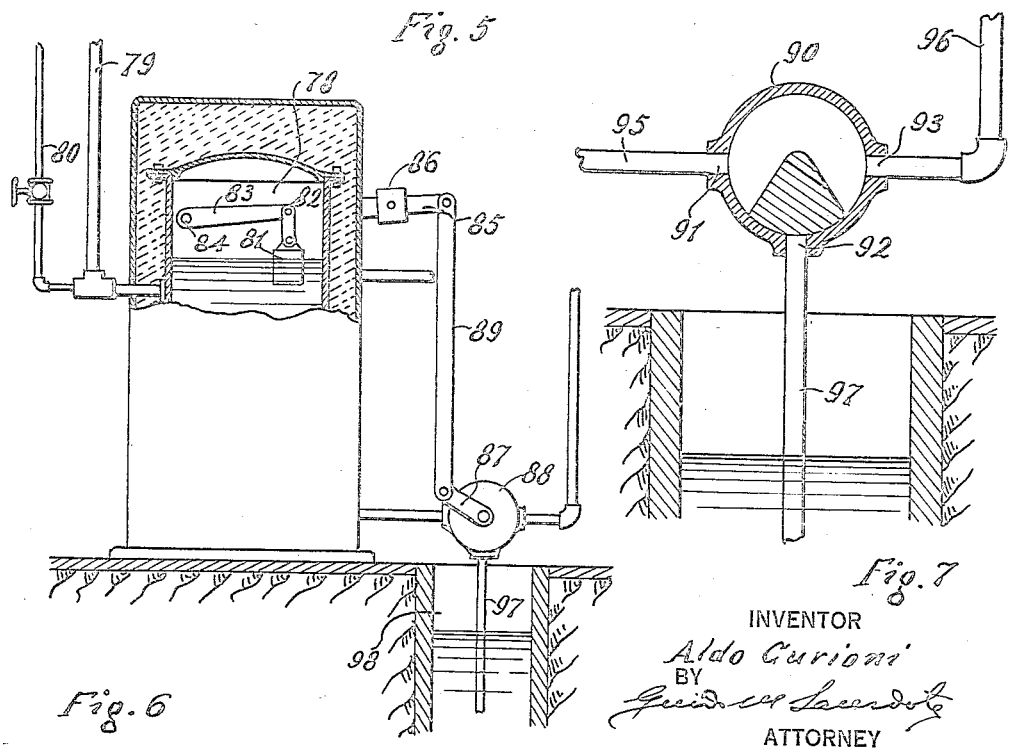

Patented Dec. 24, 1935

2,025,341

UNITED STATES PATENT OFFICE 2,025,341

HEATING PLANT

Aldo Curioni, Katonah, N. Y., assignor of one-half to J. William Mengel, New York, N. Y.

Application June 9, 1933, Serial No. 675,007

2 Claims. (Cl. 237—13)

This invention relates to heating apparatus and more particularly refers to improvements in heating apparatus for domestic and other purposes.

The primary object of the present invention is to provide a novel and improved type of heating apparatus, extremely compact in form and relatively inexpensive, adapted to furnish heat quickly and efficiently at relatively low cost.

Another object is to provide a heating apparatus of a novel and improved design, adapted to provide heat at relatively low cost, possessing the advantages of cleanliness, small bulk and relatively noiseless and automatic operation.

A further object is to provide a novel type of heating apparatus in which the heat is generated by the operation of an internal combustion engine, the apparatus being so arranged that a maximum heating efficiency can be obtained by utilizing both the heat directly produced by the combustion of the fuel and the heat obtainable by proper conversion of the power generated by the engine.

A still further object is to provide a novel and improved method of operating heating plants, whereby an internal combustion engine is used both as a direct and indirect source of heat, this resulting in a very efficient utilization of the heat generated by the combustion of a liquid fuel.

Other objects and advantages of the present invention will more fully appear as the description proceeds and will be set forth and claimed in the appended claims.

My invention is illustrated by way of example in the accompanying drawings, in which:

Fig. 2 is a vertical section of a heating apparatus embodying my invention;

Fig. 3 is a side elevation thereof, partly broken away and sectioned;

Fig. 5 is a diagrammatic illustration of an electric circuit which may be used for the automatic operation of the device;

Fig. 6 is a detail illustrating an alternative arrangement for supplying fresh water to the water tank; and Fig. 7 illustrates in section a valve adapted for use in connection with the arrangement of Fig. 6.

My invention consists essentially in utilizing both directly and indirectly the heat produced by the combustion of fuel in an internal combustion engine for supplying heat to a house heating plant, and also for constantly maintaining a supply of hot water for domestic purposes.

However, in a majority of domestic households, power as such is rarely needed, it being usually cheaper and more convenient to use electric power supplied by public utilities whenever available. On the other hand, it would not be economical to run an internal combustion engine purely for the purpose of utilizing the heat of the jacket water and the heat of the exhaust gases, since that portion of the heat of combustion which would be transformed into power would be totally wasted. By providing means whereby the power generated by the engine can also be retransformed into and utilized as a source of heat, I produce a heating plant which possesses a number of advantages over the types of heating plants now in common use. Such a heating plant can be made entirely automatic in operation, it will raise heat quickly and both in cost of installation and operation will compare very favorably with existing plants.

Figure 1:
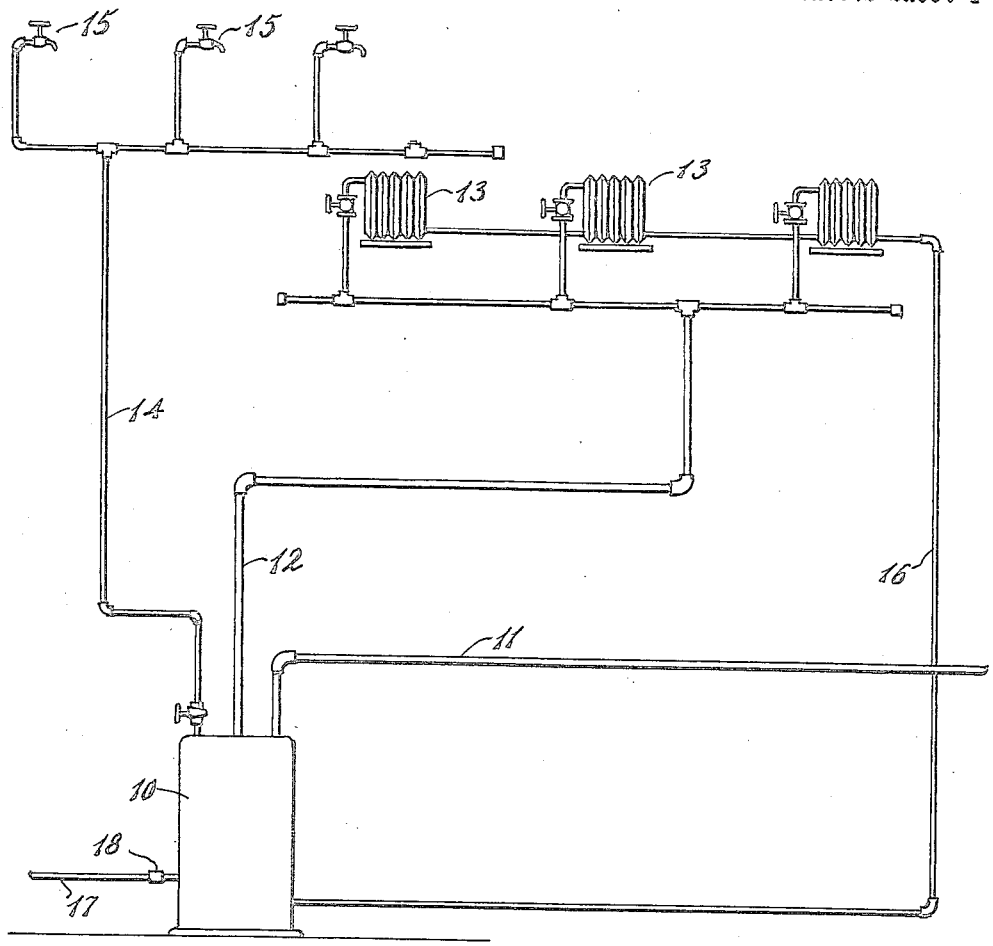
Fig. 1 is a schematic arrangement of a heating plant, including my heating apparatus.
Figure 4:
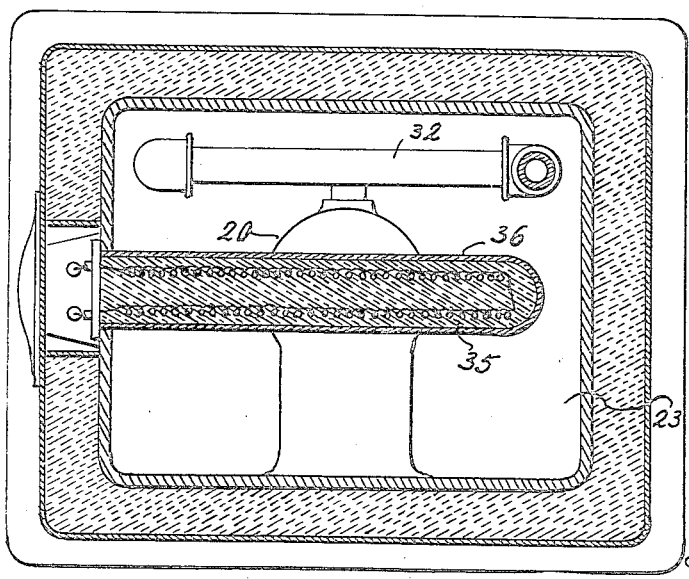
Fig. 4 is a horizontal section through line 4—4 of Fig. 3.

A plant embodying my invention is diagrammatically shown in Fig. 1, in which 10 designates my improved heating apparatus, comprising in unit form an internal combustion engine, a hot water tank, an electric generator, and means for converting into heat the current generated thereby, as shown more in detail in Figs. 2 to 4; said heating apparatus preferably also including a circulating pump for maintaining the water in active circulation throughout the heat radiating units.

Said heating plant is provided with an outlet tube 11, for the discharge of the exhaust gases of the engine after the major part of the heat of said gases has been transferred to the water within the tank; a heating water supply main 12 leading to the radiating units 13, and a hot water supply pipe 14, leading to faucets 15. The cooled return water from the radiators is led back to the water tank by a return pipe 16, and fresh water is admitted to the water tank through pipe 17 connected with the house supply, whenever water is withdrawn at the faucets 15. The water from pipe 17 is automatically admitted to the water tank through a check valve 18.

The heating apparatus proper is illustrated in detail in Figs. 2 to 4. In the same it will be seen that the same comprises a base 19, from which upwardly extends a frame including a central portion 20, constituting the cylinder of a two-cycle internal combustion engine and an outer portion or shell 21, provided with a top 22, forming a water tank 23, surrounding said cylinder. The engine proper also comprises a piston 24, connected to a crank shaft 25 by connecting rod 26, and the armature of a preferably low-voltage electric generator 27 is mounted on an extension of crank shaft 25. In the preferred type of apparatus, I also provide a circulating pump 28, actuated by the engine shaft, the inlet end of said pump being connected to the return pipe 16 and its discharge end leading to the inside of water tank 23.

A battery 29 is also provided for the ignition system of the engine, leading to spark plug 30, and said battery is also preferably used as a source of current to energize the generator and causing it to act as a motor to crank the engine, when its operation is started. However, it is to be understood that a source of current other than a battery can be used if available and preferable, for starting purposes or for both starting and ignition purposes.

The exhaust gases issuing through port 31 of the cylinder are caused to follow a circuitous path through a coil 32, located within the water tank and to be finally discharged through tube 11.

By virtue of this construction, it will be seen that a maximum part of the heat conducted through the cylinder wall will be transferred to the water within the water tank together with a maximum part of the waste heat contained in the exhaust gases. The exhaust gases could, of course, be discharged directly into the water tank, but I prefer to prevent their coming into direct contact with the water, in order to prevent its contamination.

The current generated by generator 27 is led by two wires 33, 34 to the resistance coil 35 of a heating cartridge 36, projecting within the water tank; the current will thus be converted into heat, which will be transferred to the water within the tank by said cartridge. It is thus obvious that practically the entire operation of the engine is utilized for the production of heat, although if a larger engine is used than is needed for heating purposes, the possibility of also utilizing part of the power for other purposes, such as mechanical refrigeration, washing, vacuum sweeping, etc., is not to be excluded.

The engine may, of course, be provided with a self-starter of the ordinary type but I prefer to use instead a generator capable of generating a current having a low voltage, substantially equivalent to the voltage of the current generated by the battery when fully charged, and to connect the generator and battery in a single circuit in such a way that they act alternately to energize each other.

By providing a suitable thermostatic control, responsive to the temperature of the water within the tank, the operation of the apparatus can be made entirely automatic. To this end, a thermostatic device or devices are provided at some suitable point, said device, or devices, being inserted in the electric circuit so as to control the operation of the engine. Such thermostatic devices are not shown in Figs. 2 to 4, but are indicated in the diagram of Fig. 5, which should be understood as forming part of the device shown in Figs. 2 to 4. The efficiency of the heating plant is further enhanced by surrounding the same with a shell 37, forming a chamber 38, which can be filled with refractory or heat insulating material 39.

In Fig. 5, I illustrate a type of electric circuit which may be used to effect the automatic control of the operation of the entire apparatus. In the same it will be seen that a wire 40 leads from one of the terminals of battery 29 to one of the poles 41 of armature 42 of the generator, the current returning to the battery from pole 43 through wire 44.

As previously stated, heating element 35 forms a closed circuit with wires 33, 34, leading to poles 41, 43 of the generator, respectively and field 45 of the generator is inserted in shunt between said two wires 33, 34. A hand-switch 46 is preferably provided in the circuit of the heating element, in order to cut off said heating element whenever it should be desirable to use the power generated by the engine for other than heating purposes.

A wire 47 is provided across wires 40, 44 of the battery circuit, the primary 48 of the spark plug transformer T being inserted in said wire. The secondary 49 of the transformer is inserted in circuit 50 of spark plug 30 in the usual manner and so is a timer or interrupter 50'.

To complete the circuit a thermostatic switch 51 is inserted in wire 47 and another thermostatic switch 52 is inserted in wire 44, said thermostatic switches being responsive to the temperature of the water within tank 23 and being open when the temperature of said water reaches a certain predetermined maximum and being closed when the temperature reaches a certain predetermined minimum.

A hand-switch H is preferably provided in the generator-battery circuit, said switch comprising a switch lever 53 adapted to interrupt the circuit of wire 44 and a switch lever 54, adapted to simultaneously interrupt the circuit of wire 40, said levers being connected by an insulating cross bar 55 provided with an operating handle 56.

It will be understood that both switch 46 and switch H are normally closed. The diagram illustrates the closed position of thermostatic switches 51, 52, obtaining when the temperature of the water within tank 23 is at or lower than the predetermined minimum, the engine being at rest due to the fact that the hand-switch H being open no current flows through the system.

When hand-switch H is thrown to its closed position current from battery 29 flows through wire 44, thermostatic switch 52, switch lever 53, pole 43, armature 42, pole 41, and field 45 of the generator, wire 40, switch lever 54 and back to the battery. The generator, therefore, will be energized and will act as a motor starting the operation of the engine.

This will in turn actuate interrupter 50, starting and timing operation of spark plug 30.

As soon as the operation of the engine is thus started the generator will act to generate current, which will flow through the heating element 35, and which will also flow through the battery circuit to charge the battery whenever the potential difference between the terminals of said battery should be below the voltage of the current thus generated. The battery will thus be maintained fully charged at all times so as to be always in condition for service. Wire 47 extending across wires 40, 44 can, of course, be energized by either the battery or the generator, as the case may be.

The engine and the generator being now running the temperature of the water within tank 23 will gradually increase up to a point where thermostatic switches 51, 52 will be thrown open. Switch 51 will interrupt the circuit of the primary of the spark coil, so that the operation of the spark plug will cease and with it the operation of the engine. Switch 52 is inserted in the battery circuit for the purpose of preventing the possibility of the battery losing its charge by being inserted in a close circuit with the generator and the heating element during periods of rest of the engine.

When, due to the opening of thermostatic switch 51 the operation of the engine stops, the water within tank 23 will gradually cool down until a certain minimum temperature having been reached thermostatic switches 51, 52 will once more close and the operation will be resumed.

In the arrangement of Figs. 1 to 4, the hot water drawn from the faucets 15 will be replaced by fresh water admitted from the supply pipe 17 through the check valve 18. In many cases it may be necessary, or preferable, to replace the water used from a well or other source of local supply. In such cases, a suitable arrangement may be provided for causing the circulation pump to draw water from said well or other source of supply when the level within the water tank drops.

An arrangement adapted to meet such a condition is shown in Figs. 6, 7. In the same, 76 designates the heating apparatus, comprising a water tank 77, within the upper portion of which, 78, is imprisoned a certain quantity of air which acts as a pressure cushion against the water flowing through the circuit of heating main 79 and hot water supply pipe 80. A float 81 is connected at 82 to a lever 83, fixed on a pivot 84 projecting through the wall of the tank. Fixed on said pivot, externally to the tank, is another lever 85, which may be provided with a shiftable counterweight 86, and the outer end of said lever 85 is connected to the arm 87 of a three-way valve 88, by a connection 89.

Referring more particularly to Fig. 7, it will be seen that valve 88 comprises a body 90, having three ports 91, 92, 93, and a rotatable member 94 connected to and movable with arm 87, said rotatable member normally establishing connection between ports 91, 93, as shown, and closing port 92. Port 91 is connected by a pipe 95 to the inlet end of the circulating pump (not shown). Port 93 is connected to the return pipe 96 from the radiators of the heating system, and port 92 is provided with a suction pipe 97, extending downwardly therefrom to the water contained within well or system 98.

When the level of the water within tank 77 is normal, as shown, the action of the pump is limited to circulating the water between the water tank and the heating system. When water is drawn through pipe 80 the level of the water within tank 77 will decrease and this will cause arm 87 to move downwardly, causing angular movement of valve member 94 in a counterclockwise direction. When the level of the water within tank 77 reaches a certain predetermined minimum, member 94 will open port 92 and the action of the pump will be exerted to draw water simultaneously from both pipes 97, 96. The segmental portion of member 24 can be so arranged that when port 92 starts to open, port 93 starts to close, so that the water may be supplied to the pump through a uniform section, port 93 being fully closed when port 92 is fully open and vice versa.

From the foregoing it will be seen that I provide a new, excessively simple and economical type of heating apparatus, which may advantageously replace the coal or oil-fired burners used in house heating installations.

The constructional details of my device may vary to a certain extent from those shown without departing from the inventive idea; the drawings, therefore, will be understood as being intended for illustrative purposes only and not in a limiting sense.

I, accordingly, reserve the right to carry my invention into practice in all those ways and manners which may enter, fairly, into the scope of the appended claims.

I claim:

1. A heating plant comprising, in unit form, an internal combustion engine, a water tank surrounding the cylinder thereof, means within said tank for transmitting to the water therein contained waste heat from the exhaust gases of said engine, a dynamo operatively associated with said engine, an electric heating element within said tank, adapted to be energized by said dynamo, a radiator, a pump driven by said engine for circulating water between said radiator and said water tank, and means responsive to the temperature of the water within said tank, automatically controlling the operation of said engine.

2. A heating plant comprising, in combination, an internal combustion engine having a cylinder provided with an exhaust outlet, a water tank surrounding said cylinder and defining a space for water between said cylinder and the walls of said tank, a conduit of substantial length connected to said exhaust outlet and located within said space so that heat generated within the combustion chamber of said engine and heat from the engine exhaust gases will be transferred to the water within said space, a radiator connected to said water tank, and a pump driven by said engine for circulating water through said radiator and water tank.

ALDO CURIONI.